C. H. SHIPMAN.
OPERATING MEANS FOR DIRECTION INDICATORS.
APPLICATION FILED SEPT. 3, 1919.
1,339,071.
Patented May 4, 1920.
Fig. 1.
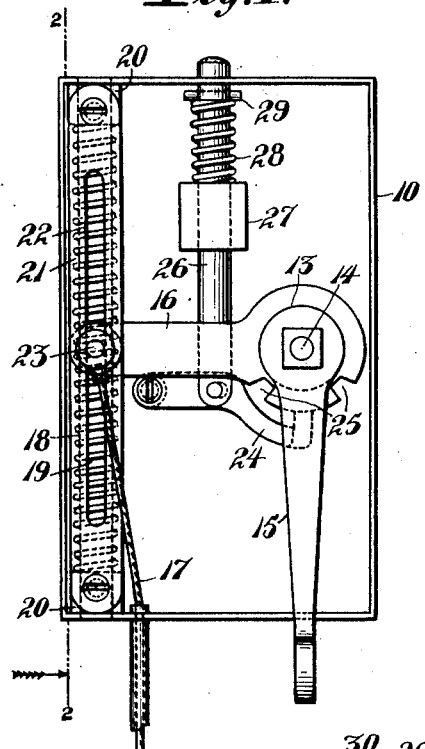
Fig. 2.
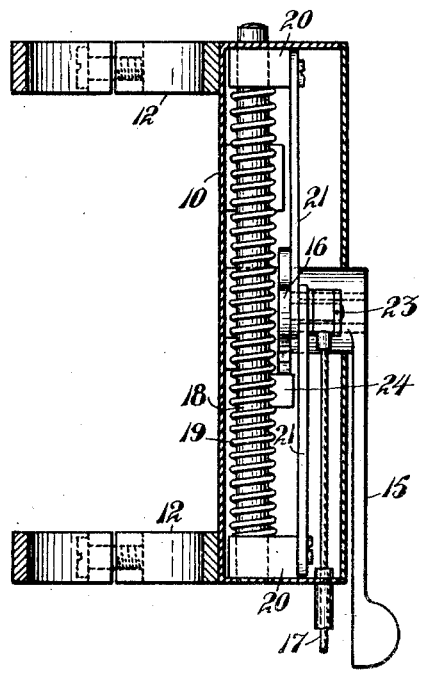
Fig. 3.
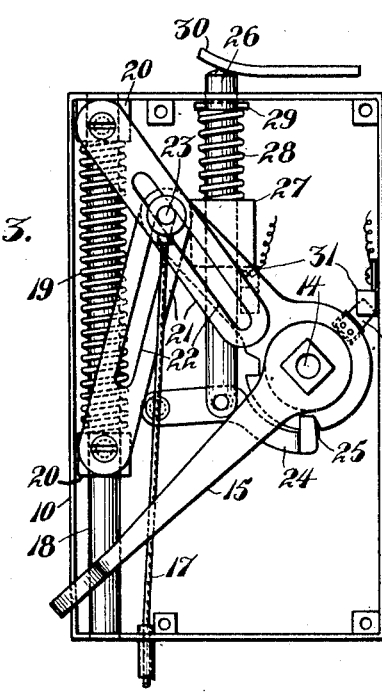
Fig. 4.
INVENTOR
Charles H. Shipman
BY
Strong & Townsend
ATTORNEYS

UNITED STATES PATENT OFFICE.

CHARLES H. SHIPMAN, OF SAN FRANCISCO, CALIFORNIA.

OPERATING MEANS FOR DIRECTION-INDICATORS.

1,339,071.  Specification of Letters Patent.  Patented May 4, 1920.

Application filed September 3, 1919. Serial No. 321,428.

*To all whom it may concern:*

Be it known that I, CHARLES H. SHIPMAN, a citizen of the United States, residing at the city and county of San Francisco and State of California, have invented new and useful Improvements in Operating Means for Direction-Indicators, of which the following is a specification.

This invention relates to direction indicators applicable to motor vehicles and adapted to show when the vehicle is about to turn toward one side or the other.

Various forms of indicating apparatus of this character are already known and the present invention relates only to an operating mechanism for an indicator of this class. The prior devices include a suitable indicator usually arranged at the rear of the vehicle and having a movable element on which the directions are shown. Some of these indicators employ electrical means for indicating the directions, dispensing with the movable element. In the mechanically operated indicators it has been proposed heretofore to operate the indicator directly from the steering mechanism of the vehicle, but with such an arrangement it is not possible to give a warning far enough in advance of the actual turning of the vehicle to be effective. The indicator begins to move directly when the steering wheel is turned, which is often too late to enable the driver of the following vehicle to adjust his course accordingly. Other prior indicating devices have been provided with manually operated means, but with this latter class considerable time and trouble are required to properly operate them. Some of the devices of this class require two separate actuations, one to move the signal into position and another to return it to neutral position. With a device of this type the operator frequently forgets after making the turn to return the signal to the neutral position and it continues to be displayed with the result that confusion is caused to the occupants of vehicles in the rear thereof. Another type of manually operating device requires the operator to hold the actuating member in operative position long enough to allow the signal to be properly displayed. The objection to this is that it takes too much of the time of the operator and distracts his attention at a time when it is necessary to manipulate other controls in making the turn.

In the present invention I provide a controlling or operating mechanism applicable to various types of indicators, either electrical or mechanical, wherein an actuating member is first moved to cause the signal to be displayed and automatically remains in this position until such time as the steering mechanism is operated to make the turn whereby an element on the steering mechanism will cause the actuating member to be released, spring means being provided to return the actuating member to neutral position. Therefore when the actuating member is moved to display the signal the operator need give it no further attention and the signal will remain displayed until such time as the turning is actually accomplished. The actuating member is also capable of being released by hand, so that if a mistake is made, such as moving the actuating member in the wrong direction or at the wrong time, it can be corrected without turning the steering wheel.

In the accompanying drawing I show a preferred form of my invention wherein—

Figure 1 is a plan view of the device with the cover of the casing removed.

Fig. 2 is a sectional view on the line 2—2 of Fig. 1.

Fig. 3 is a view similar to Fig. 1 with the parts in a different position.

Fig. 4 shows a plan view of a steering wheel illustrating one manner of mounting the apparatus thereon.

Any type of indicator, either electrical or mechanical, may be used in connection with my operating mechanism, and therefore I have not illustrated any particular indicator. In its present form the operating mechanism is primarily designed for use with an indicator such as shown in my co-pending application, Serial No. 196,820, filed Oct. 16th, 1917, wherein a wire or cable is employed to operate a rotatable member on which the directions are displayed. Movement of the wire or cable in one direction causes one side to be brought into view, and the movement of the wire or cable in the opposite direction causes another sign to be brought into view, a point between the two extremes representing the neutral position where neither sign will be displayed. The actuating mechanism is contained in a casing 10 designed to be mounted on the steering post 11 of an automobile by means of clamps or brackets 12. This actuating mechanism comprises a bell crank lever 13 journaled in the casing at 14 and having an arm 15 projecting through the casing, and another arm 16 to which the operating wire or cable 17 is attached.

Spring means are provided to retain the bell crank lever in position representing the neutral position of the signs. This spring means as here shown comprises a rod 18 on which a spring 19 is coiled. Each end of the spring abuts against a sliding collar 20 on the rod, and pivotally connected to each of these collars is a link 21 having a slot 22 through which passes a pin 23 on the arm 16 of the bell crank lever. When the bell crank lever is rocked upwardly, considering the position of the parts in Fig. 3, the spring will be compressed by the upward movement of the lowermost link, and when the bell crank lever is rocked in the opposite direction the spring will be compressed upon the downward movement of the uppermost link. I provide means to retain the bell crank lever in its extreme positions of movement, said means in its present form comprising a pivoted hook 24 coöperating with notches 25 on the bell crank lever. Connected to the hook 24 is a rod 26 extending upwardly and passing through an opening in the casing and projecting a short distance therefrom. The rod 26 passes through a guide 27 fixed to the casing and abutting this guide is a coiled spring 28 carried on the rod and pressing against a pin 29 on the rod to force the latter outwardly and retain it normally in extended position where the hook will be engaged in one of the notches 25.

The casing when mounted on a steering post of an automobile, as shown in Fig. 4, is so positioned that the projecting end of the rod 26 will be in the path of cam mechanism 30 fixed on the steering wheel. In the operation of the device the parts are retained normally in the position shown in Fig. 1, which represents a neutral position for the indicating signs. Should it be desired to turn the vehicle in one direction or the other the projecting arm 15 is moved either to the right or left, depending upon the direction of turning, and is held in this position by the spring pressed latch previously described. Thereafter, as the steering wheel is turned to guide the vehicle at the corner, the cam device 30 will be carried with the wheel into engagement with the projecting end of the rod 26, thereby releasing the bell crank lever and allowing the latter to return to neutral position under the action of the spring 19.

The present mechanism is also suitable for use in connection with electrical indicators without radical modification. To make this clear I have shown in Fig. 3 electrical contacts 31 fixed within the casing and a member 32 mounted upon the bell crank lever to close the electrical circuit, the journal pin of the bell crank lever itself forming the other terminal for the circuit.

It will readily be seen that this device is susceptible of a great many changes and that it can be employed in connection with most of the types of indicators now in use.

Having thus described my invention, what I claim and desire to secure by Letters Patent is:

1. In a direction indicator for automobiles, an actuating member adapted to be moved in opposite directions for causing the proper signal to be displayed, yielding means tending to restore the actuating member and connected parts to neutral or inoperative position, means to retain said parts in operative position, and means carried by the steering wheel of the automobile and movable into engagement with the retaining means to release the latter when the contemplated turn has been effected.

2. An operating mechanism for direction indicators for use on automobiles comprising an actuating member adapted to be moved in opposite directions for causing the required signal to be displayed, spring-pressed means for retaining said actuating member in neutral position, a latch device for retaining said actuating member in operative position and means movable with the steering mechanism of the automobile to release said latch device.

3. An operating mechanism for direction indicators for use on automobiles comprising an actuating member movable in opposite directions for causing the required signal to be displayed, spring-pressed means for retaining said actuating member in neutral position and a latch device for retaining the actuating member in operative position.

In testimony whereof I have hereunto set my hand in the presence of two subscribing witnesses.

CHARLES H. SHIPMAN.

Witnesses:
 GEO. W. RODOLPH,
 D. WILLIAMSON.